(12) United States Patent
Niu et al.

(10) Patent No.: US 12,526,623 B2
(45) Date of Patent: Jan. 13, 2026

(54) BLUETOOTH RANDOM ADDRESS GENERATION METHOD AND RELATED ELECTRONIC DEVICE

(71) Applicant: Honor Device Co., Ltd., Guangdong (CN)

(72) Inventors: Yongmin Niu, Shenzhen (CN); Yequan Song, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 111 days.

(21) Appl. No.: 18/570,498

(22) PCT Filed: Aug. 30, 2022

(86) PCT No.: PCT/CN2022/115777
§ 371 (c)(1),
(2) Date: Dec. 14, 2023

(87) PCT Pub. No.: WO2023/109187
PCT Pub. Date: Jun. 22, 2023

(65) Prior Publication Data
US 2024/0284169 A1    Aug. 22, 2024

(30) Foreign Application Priority Data

Dec. 17, 2021  (CN) .......................... 202111555506.5

(51) Int. Cl.
*G06F 15/16* (2006.01)
*G06F 9/54* (2006.01)
(Continued)

(52) U.S. Cl.
CPC ....... *H04W 12/041* (2021.01); *H04L 61/5038* (2022.05); *H04L 61/5092* (2022.05); *H04L 9/0869* (2013.01)

(58) Field of Classification Search
CPC ........... H04W 12/041; H04W 52/0245; H04W 52/0206; H04W 52/0258; H04W 52/028;
(Continued)

(56) References Cited

U.S. PATENT DOCUMENTS 9,788,351 B2 * 10/2017 Hariharan ............... H04W 4/80
9,853,969 B2 * 12/2017 Enke ....................... H04W 4/80
(Continued)

FOREIGN PATENT DOCUMENTS

CN         103368722 A     10/2013
CN         108990055 A     12/2018
(Continued)

OTHER PUBLICATIONS

Bluetooth Sig Proprietary: "Core System Package [Low Energy Controller volume], Specification of the Bluetooth System, Specification vol. 6", Covered Core Package Version: 5.0, Jun. 2016 (Jun. 1, 2016); 263 total pages.

*Primary Examiner* — Hamza N Algibhah
(74) *Attorney, Agent, or Firm* — Rimon PC

(57) ABSTRACT

This application provides a Bluetooth random address generation method and a related electronic device. The method includes: the Bluetooth Host generates an identity resolving key (IRK); the Bluetooth Host sends the IRK to the Bluetooth module when the electronic device meets a first condition, where the first condition is a condition for triggering the electronic device to reduce power consumption; the Bluetooth module generates a resolvable private address (RPA) based on the IRK, and periodically updates the RPA based on the IRK; the Bluetooth Host sends an RPA request to the Bluetooth module when the Bluetooth Host needs to execute a Bluetooth service; the Bluetooth module sends a latest updated RPA to the Bluetooth Host; and the Bluetooth Host executes the Bluetooth service based on the latest updated RPA. Therefore reducing the power consumption of (Continued)

the AP chip, and extending the standby time of electronic device.

13 Claims, 9 Drawing Sheets

(51) Int. Cl.
  *H04L 29/06* (2006.01)
  *H04L 61/5038* (2022.01)
  *H04L 61/5092* (2022.01)
  *H04W 12/041* (2021.01)
  *H04L 9/08* (2006.01)

(58) Field of Classification Search
  CPC ....... H04W 84/18; H04W 4/80; H04W 12/04; H04W 76/11; H04W 8/26; H04L 61/5038; H04L 61/5092; H04L 9/0869; H04L 2101/681; H04L 61/00; H04L 2101/622; H04L 63/06; H04L 63/0414; H04L 63/0428; Y02D 30/70
  USPC ........................................... 713/168
  See application file for complete search history.

(56) References Cited

U.S. PATENT DOCUMENTS

| | | | | |
|---|---|---|---|---|
| 11,310,118 | B2* | 4/2022 | Tavares | H04W 4/80 |
| 11,317,803 | B2* | 5/2022 | Wu | A61B 5/686 |
| 2013/0003632 | A1* | 1/2013 | Salomone | H04W 52/0225 |
| | | | | 370/311 |
| 2013/0259230 | A1* | 10/2013 | Polo | H04L 63/0272 |
| | | | | 380/270 |
| 2014/0057567 | A1* | 2/2014 | Desai | H04L 63/02 |
| | | | | 455/41.2 |
| 2016/0099936 | A1* | 4/2016 | Enke | H04W 4/80 |
| | | | | 726/7 |
| 2016/0100275 | A1* | 4/2016 | Viswanadham | H04W 4/21 |
| | | | | 455/41.2 |
| 2016/0100276 | A1* | 4/2016 | Viswanadham | H04W 8/005 |
| | | | | 455/41.2 |
| 2016/0262193 | A1* | 9/2016 | Hariharan | H04W 76/10 |
| 2017/0372600 | A1* | 12/2017 | Palin | H04W 4/80 |
| 2018/0198752 | A1* | 7/2018 | Zhang | H04L 61/5038 |
| 2019/0253857 | A1 | 8/2019 | Li et al. | |
| 2022/0124505 | A1* | 4/2022 | Lin | H04W 4/80 |
| 2023/0091254 | A1* | 3/2023 | Lee | H04L 63/123 |
| | | | | 726/4 |
| 2023/0256780 | A1* | 8/2023 | Houston | B60C 23/0471 |
| | | | | 701/29.4 |

FOREIGN PATENT DOCUMENTS

| | | | | |
|---|---|---|---|---|
| CN | 108769973 B | | 4/2021 | |
| EP | 2645665 A1 | * | 10/2013 | ......... H04L 63/0272 |
| WO | WO-2016053909 A1 | * | 4/2016 | ......... H04L 63/0414 |
| WO | WO-2017003337 A1 | * | 1/2017 | ............ H04W 12/02 |

* cited by examiner

BLUETOOTH RANDOM ADDRESS GENERATION METHOD AND RELATED ELECTRONIC DEVICE

CROSS-REFERENCE TO RELATED APPLICATIONS

This application is a National Stage of International Application No. PCT/CN2022/115777, filed on Aug. 30, 2022, which claims priority to Chinese Patent application Ser. No. 20/2111555506.5, filed on Dec. 17, 2021, both of which are incorporated herein by references in their entireties.

TECHNICAL FIELD

This application relates to the Bluetooth communication field, and in particular, to a Bluetooth random address generation method and a related electronic device.

BACKGROUND

As an electronic device is widely used, Bluetooth is also increasingly used. Bluetooth is a radio technology that supports short-range communication (usually within 10 m) between devices and in which wireless information can be exchanged between a plurality of devices including a mobile phone, a PDA, a wireless headset, a notebook computer, a related peripheral, and the like. Based on a Bluetooth technology, communication between mobile communication terminal devices can be effectively simplified, and communication between a device and the Internet can also be successfully simplified, so that data transmission becomes more rapid and efficient, and a road for wireless communication is widened. In addition, as a small-range wireless connection technology, Bluetooth can implement convenient, fast, flexible, safe, low-cost, and low-power consumption data communication and voice communication between devices. Therefore, Bluetooth is one of mainstream technologies for implementing wireless personal area network (Personal Area Network, PAN) communication.

SUMMARY

Embodiments of this application provide a Bluetooth random address generation method and a related electronic device, to resolve a problem that when a Bluetooth function is enabled, a Bluetooth Host deployed on an AP chip wakes up an AP chip because the Bluetooth Host periodically updates an RPA, thereby increasing power consumption of the AP chip, and affecting working performance of the AP chip.

According to a first aspect, an embodiment of this application provides a Bluetooth random address generation method, applied to an electronic device. The electronic device includes a Bluetooth Host and a Bluetooth module, and the method includes: The Bluetooth Host generates an identity resolving key (IRK); the Bluetooth Host sends the identity resolving key to the Bluetooth module when the electronic device meets a first condition, where the first condition is a condition for triggering the electronic device to reduce power consumption; the Bluetooth module generates a resolvable private address (RPA) based on the identity resolving key IRK, and periodically updates the RPA based on the IRK; the Bluetooth Host sends an RPA request to the Bluetooth module when the Bluetooth Host needs to execute a Bluetooth service; the Bluetooth module sends a latest updated RPA to the Bluetooth Host; and the Bluetooth Host executes the Bluetooth service based on the latest updated RPA.

In the foregoing embodiment, after generating the IRK, the Bluetooth Host may send the IRK to the Bluetooth module (the Bluetooth module is a sensor hub or a Bluetooth Controller). The sensor hub or the Bluetooth Controller periodically updates the RPA based on the IRK sent by the Bluetooth Host. When the Bluetooth Host needs to execute the Bluetooth service, the sensor hub or the Bluetooth Controller may send the latest updated RPA to the Bluetooth Host, so that the Bluetooth Host can execute the Bluetooth service. Because power consumed when the sensor hub/Bluetooth Controller updates the RPA is less than power consumed when the Bluetooth Host updates the RPA, the Bluetooth Host decentralizes an RPA updating function to the sensor hub/Bluetooth Controller, to reduce power consumption of an AP chip, and further improve working performance of the AP chip.

With reference to the first aspect, in a possible implementation, the Bluetooth module is a Bluetooth Controller or a sensor hub.

With reference to the first aspect, in a possible implementation, the first condition is as follows: no application currently runs on the electronic device; or a current battery level of the electronic device is less than a first threshold; or a quantity of high-power consumption applications in applications that currently run on the electronic device is greater than or equal to a second threshold, where the high-power consumption application is an application whose power consumption proportion exceeds a third threshold M or more times in N standby times in a historical time period. With reference to the first aspect, in a possible implementation, after the Bluetooth module generates the resolvable private address RPA based on the identity resolving key IRK, and periodically updates the RPA based on the IRK, the method further includes: When the first condition is that no application currently runs on the electronic device, whether an application is running on the electronic device is periodically detected; and the Bluetooth module sends first indication information to the Bluetooth Host if it is detected that an application is running on the electronic device, where the first indication information is used to indicate the Bluetooth Host to generate an RPA based on the identity resolving key, and periodically update the RPA based on the identity resolving key. In this way, when an application needs to use an RPA to execute a Bluetooth service, the application may directly invoke the RPA from the AP chip to execute the Bluetooth service.

With reference to the first aspect, in a possible implementation, after the Bluetooth module generates the resolvable private address RPA based on the identity resolving key IRK, and periodically updates the RPA based on the IRK, the method further includes: A battery level of the electronic device is periodically detected when the first condition is that the current battery level of the electronic device is less than the first threshold; and the Bluetooth module sends first indication information to the Bluetooth Host if it is detected that the battery level of the electronic device is greater than or equal to the first threshold, where the first indication information is used to indicate the Bluetooth Host to generate an RPA based on the identity resolving key, and periodically update the RPA based on the identity resolving key. In this way, because power consumed when the Bluetooth module updates the RPA is less than power consumed when the Bluetooth Host updates the RPA, the Bluetooth Host decentralizes the RPA updating function to the Bluetooth module, to reduce power consumption of the AP chip, reduce power consumption, and prolong standby time of the electronic device.

With reference to the first aspect, in a possible implementation, after the Bluetooth module generates the resolvable private address RPA based on the identity resolving key IRK, and periodically updates the RPA based on the IRK, the method further includes: When the first condition is that the quantity of high-power consumption applications in the applications that currently run on the electronic device is greater than or equal to the second threshold, a quantity of high-power consumption applications that run on the electronic device is periodically detected; and the Bluetooth module sends second indication information to the Bluetooth Host if it is detected that the quantity is less than the second threshold, where the second indication information is used to indicate the Bluetooth Host to generate an RPA based on the identity resolving key, and periodically update the RPA based on the identity resolving key. In this way, when current power consumption of the AP chip is high, the Bluetooth Host decentralizes, to the sensor hub, a function of periodically updating an RPA, to reduce power consumption of the AP chip, improve working efficiency of the AP chip, and prolong standby time of the electronic device.

According to a second aspect, an embodiment of this application provides an electronic device. The electronic device includes a memory, a first processor, a Bluetooth module, and a touchscreen. The touchscreen is configured to display content; the memory is configured to store a computer program, where the computer program includes program instructions; the first processor is configured to: invoke the program instructions, to generate an identity resolving key; and send the identity resolving key to the Bluetooth module when the electronic device meets a first condition; the Bluetooth module is configured to: generate a resolvable private address RPA based on the identity resolving key IRK, and periodically update the RPA based on the IRK; the first processor sends an RPA request to the Bluetooth module when the first processor needs to execute a Bluetooth service; the Bluetooth module sends a latest updated RPA to the first processor; and the first processor executes the Bluetooth service based on the latest updated RPA.

With reference to the second aspect, in a possible implementation, when the first condition is that no application currently runs on the electronic device, whether an application is running on the electronic device is periodically detected; and the Bluetooth module sends first indication information to the Bluetooth Host if it is detected that an application is running on the electronic device, where the first indication information is used to indicate the Bluetooth Host to generate an RPA based on the identity resolving key, and periodically update the RPA based on the identity resolving key.

With reference to the second aspect, in a possible implementation, a battery level of the electronic device is periodically detected when the first condition is that a current battery level of the electronic device is less than a first threshold; and the Bluetooth module sends first indication information to the Bluetooth Host if it is detected that the battery level of the electronic device is greater than or equal to the first threshold, where the first indication information is used to indicate the Bluetooth Host to generate an RPA based on the identity resolving key, and periodically update the RPA based on the identity resolving key.

With reference to the second aspect, in a possible implementation, when the first condition is that a quantity of high-power consumption applications in applications that currently run on the electronic device is greater than or equal to a second threshold, the Bluetooth module periodically detects a quantity of high-power consumption applications that run on the electronic device; and the Bluetooth module sends second indication information to the Bluetooth Host if it is detected that the quantity is less than the second threshold, where the second indication information is used to indicate the Bluetooth Host to generate an RPA based on the identity resolving key, and periodically update the RPA based on the identity resolving key.

According to a third aspect, an embodiment of this application provides an electronic device, including a memory, a first processor, a Bluetooth module, and a touchscreen. The memory is configured to store computer program code, the computer program code includes computer instructions, when the first processor executes the computer instructions, the electronic device is enabled to perform the method according to any one of the first aspect or the possible implementations of the first aspect, and when the Bluetooth module executes the computer instructions, the electronic device is enabled to perform the method according to any one of the first aspect or the possible implementations of the first aspect.

According to a fourth aspect, an embodiment of this application provides a chip system. The chip system is applied to an electronic device, the chip system includes one or more processors, and the one or more processors are configured to invoke computer instructions, so that the electronic device performs the method according to any one of the first aspect or the possible implementations of the first aspect.

According to a fifth aspect, an embodiment of this application provides a computer program product including instructions. When the computer program product is run on an electronic device, the electronic device is enabled to perform the method according to any one of the first aspect or the possible implementations of the first aspect.

According to a sixth aspect, an embodiment of this application provides a computer-readable storage medium, including instructions. When the instructions are run on an electronic device, the electronic device is enabled to perform the method according to any one of the first aspect or the possible implementations of the first aspect.

DESCRIPTION OF EMBODIMENTS

Figure 1:
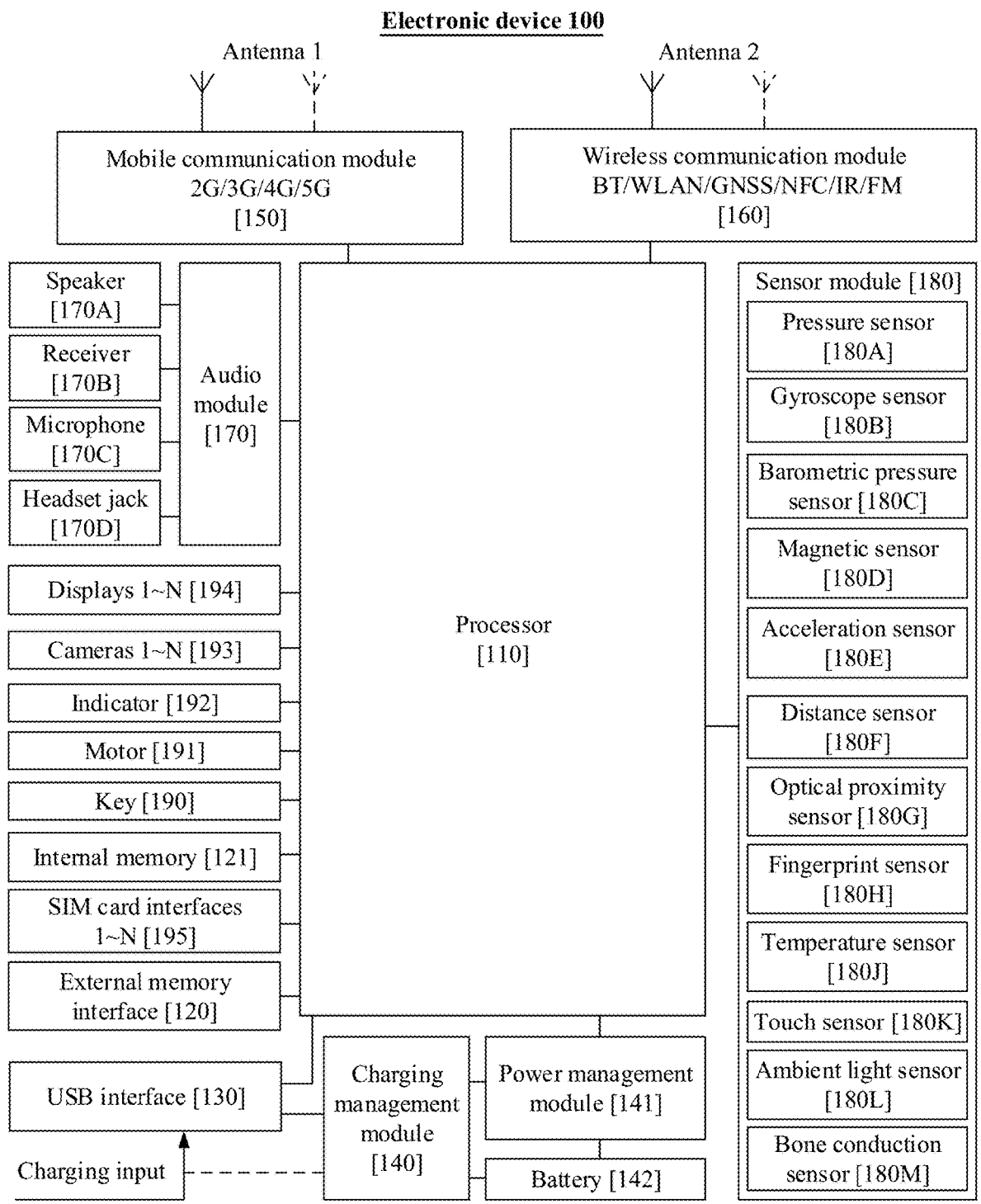
FIG. 1 is a schematic diagram of a hardware structure of an electronic device 100 according to an embodiment of this application.

The following clearly describes technical solutions in embodiments of this application with reference to the accompanying drawings in the embodiments of this application. It is clear that the described embodiments are merely some but not all of embodiments of this application. Mentioning an "embodiment" in this specification means that a specific feature, structure, or characteristic described with reference to this embodiment may be included in at least one embodiment of this application. The term appearing at various locations in this specification does not necessarily refer to a same embodiment, or an independent or alternative embodiment mutually exclusive with another embodiment. A person skilled in the art may explicitly and implicitly understand that the embodiments described in this specification may be combined with another embodiment. Based on the embodiments of this application, all other embodiments obtained by a person of ordinary skill in the art without creative efforts fall within the protection scope of this application.

In the specification, claims, and accompanying drawings of this application, the terms "first", "second", "third", and the like are intended to distinguish between different objects, but are not intended to describe a particular order. In addition, the terms "include" and "have" and any variations thereof are intended to cover a non-exclusive inclusion. For example, a series of steps or units are included, or optionally, steps or units not listed are further included, or optionally other steps or units inherent to these processes, methods, products, or devices are further included.

The accompanying drawings show only some content related to this application but not all content. Before example embodiments are further described in detail, it should be mentioned that some example embodiments are described as processing or methods depicted as flowcharts. Although the flowcharts describe operations (or steps) as sequential processing, many of these operations may be implemented in parallel, concurrently, or simultaneously. In addition, a sequence of the operations may be rescheduled. The processing may be terminated when operations of the processing are completed, but there may be additional steps not included in the accompanying drawings. The processing may correspond to a method, a function, a procedure, a subroutine, a subprogram, and the like.

Terms "part", "module", "system", "unit", and the like used in this specification are used to represent computer-related entities, hardware, firmware, combinations of hardware and software, software, or software in execution. For example, the unit may be but is not limited to a process running on a processor, a processor, an object, an executable file, an execution thread, a program, and/or distributed between two or more computers. In addition, the unit may be executed by various computer-readable media on which various data structures are stored. For example, a unit may communicate through local and/or remote processes based on a signal with one or more data packets (for example, second unit data exchanged by another unit from a local system, a distributed system, and/or a network, and for example, the internet that interacts with another system by using a signal).

First, the terms mentioned in the embodiments of this application are described by way of example but not limitative description.

1. Bluetooth physical address (MAC address): A Bluetooth device may have two types of addresses: a public device address (Public Device Address, PDA) and a random device address (Random Device Address, RDA). For the Bluetooth device, the public device address is a number with 48 bits, and is referred to as "48-bit universal LAN MAC address". The address needs to be applied for to the IEEE, is unique, and may be used to identify the Bluetooth device. However, as a Bluetooth technology are increasingly popular and a quantity of Bluetooth users continuously increases, it is clear that a quantity of PDAs is insufficient. There are the following three specific reasons:

(1) The public device address needs to be purchased from the IEEE, and an expense is required.
(2) An application for and management of the public device address are cumbersome and complex. In addition, a quantity of Bluetooth devices is large. Consequently, maintenance costs increase.
(3) Security factor: A large part of application scenarios of Bluetooth is broadcast communication. This means that all information can be obtained provided that the address of the device is learned of. This is very insecure. Therefore, a fixed device address increases a risk of information disclosure.

To resolve the foregoing problem, an address, namely, the random device address, is added to a Bluetooth protocol. In other words, the device address is not permanently allocated, but is randomly generated after the device is started. For different purposes, random device addresses are classified into a static device address (Static Device Address, SDA) and a private device address (Private Device Address, PDA).

The static device address is an address randomly generated when the device is powered on, and has a total of 48 bits. Two most significant bits are "11", and the remaining 46 bits are a random number, and cannot be all 0 or all 1, to ensure that the device address is unique. Because the address is randomly generated, costs and maintenance problems caused by the application for the public device address can be resolved.

The private device address improves reliability and security of a Bluetooth address through periodical updating and address encryption. Private addresses are classified into a non-resolvable private address (Non-resolvable Private Address, NRPA) and a resolvable private address (Resolvable Private Address, RPA) based on whether the device address is encrypted.

The resolvable private address is generated based on a random number and an identity resolving key (Identity Resolving Key, IRK). Therefore, the resolvable private address can be scanned by only a device with a same IRK, and can be prevented from being scanned and traced by an unknown device.

2. The identity resolving key (Identity Resolving Key, IRK) is used to generate and parse the RPA.

3. A sensor hub (Sensor Hub, SH) may implement real-time control of a sensor when a CPU sleeps, to implement a function of reducing power consumption. In addition, the sensor hub may further fuse data of different types of sensors, to implement a function that can be implemented only by combining data of a plurality of types of sensors.

The following describes a hardware structure of an electronic device in an embodiment of this application with reference to FIG. 1. The electronic device has a Bluetooth function. FIG. 1 is a schematic diagram of a hardware structure of an electronic device 100 according to an embodiment of this application.

The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a key 190, a motor 191, an indicator 192, a camera 193, a display 194, a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like. It can be understood that the structure shown in this embodiment of the present invention does not constitute a specific limitation on the electronic device 100. In some other embodiments of this application, the electronic device 100 may include more or fewer components than those shown in the figure, or some components may be combined, or some components may be split, or components are arranged in different manners. The components shown in the figure may be implemented by hardware, software, or a combination of software and hardware.

The processor 110 may include one or more processing units. For example, the processor 110 may include an application processor (application processor, AP), a modem processor, a graphics processor (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU), and the like. Different processing units may be independent components, or may be integrated into one or more processors.

A wireless communication function of the electronic device 100 may be implemented by using the antenna 1, the antenna 2, the mobile communication module 150, the wireless communication module 160, the modem processor, the baseband processor, and the like.

The antenna 1 and the antenna 2 are configured to transmit and receive electromagnetic wave signals. Each antenna in the electronic device 100 may be configured to cover one or more communication frequency bands. Different antennas may be further multiplexed to improve antenna utilization. For example, the antenna 1 may be multiplexed as a diversity antenna of a wireless local area network. In some other embodiments, the antenna may be used in combination with a tuning switch.

The mobile communication module 150 may provide a solution for wireless communication including 2G/3G/4G/5G and the like applied to the electronic device 100. The mobile communication module 150 may include at least one filter, switch, power amplifier, low noise amplifier (low noise amplifier, LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal obtained after modulation by the modem processor, and convert the signal into an electromagnetic wave for radiation through the antenna 1. In some embodiments, at least some functional modules in the mobile communication module 150 may be disposed in the processor 110. In some embodiments, at least some functional modules in the mobile communication module 150 may be disposed in a same component as at least some modules in the processor 110.

The wireless communications module 160 may provide a solution for wireless communication that is applied to the electronic device 100 and that includes a wireless local area network (wireless local area network, WLAN) (for example, a Wi-Fi network), Bluetooth (BlueTooth, BT), BLE broadcast, a global navigation satellite system (global navigation satellite system, GNSS), frequency modulation (frequency modulation, FM), near field communication (near field communication, NFC), an infrared (infrared, IR) technology, and the like. The wireless communication module 160 may be one or more components integrating at least one communication processing module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

The electronic device 100 implements a display function by using the GPU, the display 194, the application processor, and the like. The GPU is a microprocessor for image processing and connects the display 194 and the application processor. The GPU is configured to perform mathematical and geometric calculation for graphics rendering. The processor 110 may include one or more GPUs, and the GPU executes a program instruction to generate or change display information.

The display 194 is configured to display an image, a video, or the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a Miniled, a MicroLed, a Micro-oLed, a quantum dot light emitting diode (quantum dot light emitting diodes, QLED), or the like. In some embodiments, the electronic device 100 may include one or N displays 194, where N is a positive integer greater than 1.

The electronic device 100 may implement a photographing function by using the ISP, the camera 193, the video codec, the GPU, the display 194, the application processor, and the like.

The ISP is configured to process data fed back by the camera 193. For example, when photographing is performed, a shutter is pressed, and light is transmitted to a photosensitive element of the camera through a lens. An optical signal is converted into an electrical signal. The photosensitive element of the camera transmits the electrical signal to the ISP for processing, to convert the electrical signal into an image visible to naked eyes. The ISP may further perform algorithm optimization on noise, brightness, and complexion of the image. The ISP may further optimize parameters such as exposure and a color temperature of a photographing scene. In some embodiments, the ISP may be disposed in the camera 193.

The digital signal processor is configured to process a digital signal, and can process another digital signal in addition to the digital image signal. For example, when the electronic device 100 selects a frequency, the digital signal processor is configured to perform Fourier transform, and the like on frequency energy.

The NPU is a neural-network (neural-network, NN) computing processor, quickly processes input information by referring to a biological neural network structure, for example, by referring to a transfer mode between human brain neurons, and may further continuously perform self-learning. Applications such as intelligent cognition of the electronic device 100, for example, image recognition, face recognition, speech recognition, and text understanding, may be implemented by using the NPU.

The electronic device 100 may implement an audio function such as music playing or recording by using the audio module 170, the speaker 170A, the telephone receiver 170B, the microphone 170C, the headset jack 170D, the application processor, and the like.

The audio module 170 is configured to convert digital audio information into an analog audio signal for output, and is also configured to convert analog audio input into a digital audio signal. The audio module 170 may be further configured to encode and decode an audio signal. In some embodiments, the audio module 170 may be disposed in the processor 110, or some functional modules in the audio module 170 may be disposed in the processor 110.

The speaker 170A, also referred to as a "horn", is configured to convert an audio electrical signal into a sound signal. The electronic device 100 may be configured to listen to music or answer a call in a hands-free mode by using the speaker 170A.

The receiver 170B, also referred to as an "earpiece", is configured to convert an audio electrical signal into a sound signal. When a call is answered or audio information is listened to by using the electronic device 100, the receiver 170B may be put close to a human ear to listen to a voice.

The microphone 170C, also referred to as a "mic" or "mike", is configured to convert a sound signal into an electrical signal. When making a call or sending voice information, a user may make a sound by approaching a mouth to the microphone 170C, to input a sound signal to the microphone 170C. The electronic device 100 may be provided with at least one microphone 170C. In some other embodiments, the electronic device 100 may be provided with two microphones 170C, and may further implement a noise reduction function in addition to collecting a sound signal. In some other embodiments, the electronic device 100 may alternatively be provided with three, four, or more microphones 170C, to collect a sound signal, reduce noise, further identify a sound source, implement a directional recording function, and the like.

The pressure sensor 180A is configured to sense a pressure signal, and may convert the pressure signal into an electrical signal. In some embodiments, the pressure sensor 180A may be disposed on the display 194.

The barometric pressure sensor 180C is configured to measure barometric pressure. In some embodiments, the electronic device 100 calculates an altitude based on a barometric pressure value measured by the barometric pressure sensor 180C, to assist in positioning and navigation.

The magnetic sensor 180D may include a Hall sensor. The electronic device 100 may detect opening/closing of a flip leather case by using the magnetic sensor 180D.

The acceleration sensor 180E may detect magnitudes of acceleration in various directions (usually on three axes) of the electronic device 100, and may detect a magnitude and a direction of gravity when the electronic device 100 is still. The acceleration sensor 180E may be further configured to identify a posture of the electronic device, and is applied to applications such as switching between a landscape mode and a portrait mode and a pedometer.

The fingerprint sensor 180H is configured to collect a fingerprint. The electronic device 100 may implement fingerprint unlocking, application lock accessing, fingerprint-based photographing, fingerprint-based call answering, and the like by using a feature of the collected fingerprint.

The touch sensor 180K is also referred to as a "touch panel". The touch sensor 180K may be disposed on the display 194. The touch sensor 180K and the display 194 form a touchscreen, also referred to as a "touch control screen". The touch sensor 180K is configured to detect a touch operation acting on or near the display. The touch sensor may transfer a detected touch operation to the application processor, to determine a touch event type. A visual output related to the touch operation may be provided by using the display 194. In some other embodiments, the touch sensor 180K may alternatively be disposed on a surface of the electronic device 100, and is at a location different from that of the display 194.

The bone conduction sensor 180M may obtain a vibration signal. In some embodiments, the bone conduction sensor 180M may obtain a vibration signal of a vibration bone in a human vocal-cord part.

Figure 2:
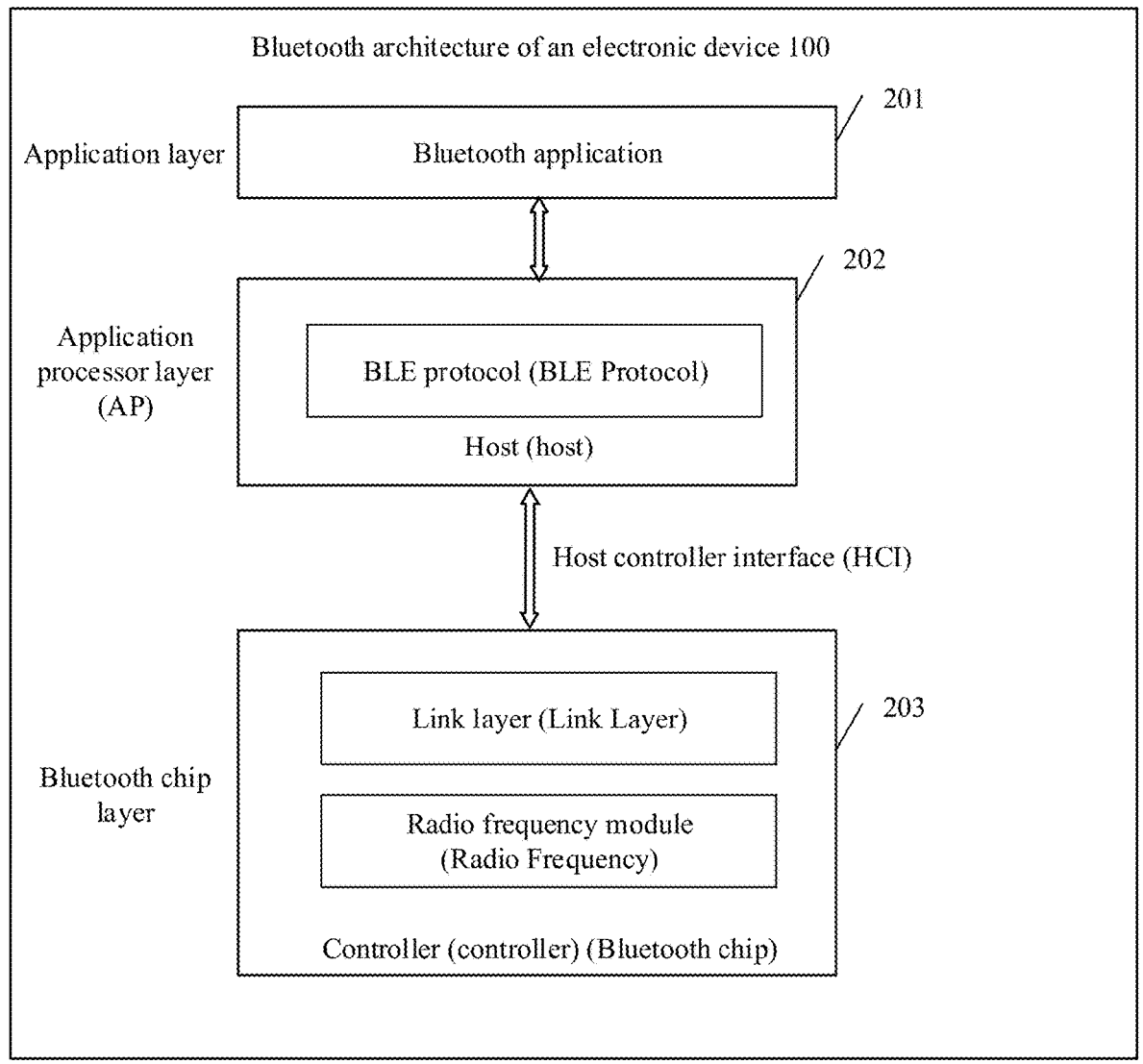
FIG. 2 is a diagram of a Bluetooth architecture of an electronic device 100 according to an embodiment of this application.

The foregoing embodiment in FIG. 1 describes the hardware structure of the electronic device 100. The following describes a Bluetooth architecture of the electronic device 100 with reference to FIG. 2. As shown in FIG. 2, the Bluetooth architecture of the electronic device 100 includes an application layer, an application processor layer, and a Bluetooth chip layer.

The application layer includes a Bluetooth application 201. The Bluetooth application may be configured to receive an instruction of a user, for example, receive a touch operation, a tap operation, a touch and hold operation, or the like of the user.

The application processor layer includes a Bluetooth Host (Bluetooth Host) 202. In this embodiment of this application, the Bluetooth Host stores protocols such as a BLE protocol used when communication is performed by using Bluetooth low energy (Bluetooth Low Energy, BLE) and a generic access profile (Generic Access Profile, GAP) for generating an IRK. It may be understood that the Bluetooth Host is a core part of a Bluetooth protocol stack, is configured to designate a secure connection, is responsible for protocol or channel multiplexing, and provide interface support for an upper-layer application. In this embodiment of this application, after a Bluetooth function of the electronic device 100 is enabled, the Bluetooth Host may generate the IRK based on the GAP protocol, and periodically update an RPA based on the IRK and a random number.

In some other embodiments, after the Bluetooth function of the electronic device is enabled, the Bluetooth Host may generate the IRK based on the GAP protocol, and send the IRK to a controller (Controller) or a sensor hub, and the controller or the sensor hub periodically updates an RPA based on the IRK.

The Bluetooth chip layer includes a controller (Controller) 203, and may also be understood as a Bluetooth chip. The Bluetooth chip includes a radio frequency (Radio Frequency, RF) module and a link layer (Link Layer).

The RF module may be configured to implement radio frequency-related analog and digital parts, to complete most basic data sending and receiving. In other words, the RF module may be configured to process a task related to a radio frequency signal (for example, is responsible for receiving/sending an air interface packet).

The link layer may determine a broadcast channel, a data transmission channel, and the like, so that a terminal reliably receives and/or sends data on a frequency band supported by the RF module. In addition, the link layer may further determine a state of Bluetooth, for example, a scanning state and an initiating state. In the scanning state, the terminal may receive data on a broadcast channel (for example, receive a BLE broadcast packet). In the initiating state, the terminal receives and processes only confirmation data sent by a device to confirm a connection, and does not receive or process the BLE broadcast packet.

The Bluetooth Host and Bluetooth Controller may communicate through a physical interface, that is, a host controller interface (Host Controller Interface, HCI). For example, the Bluetooth Controller may send data to the Bluetooth Host through the HCI, and the Bluetooth Host may send a command and data to the Bluetooth Controller through the HCI.

It can be understood that, the Bluetooth architecture of the electronic device 100 shown in FIG. 2 is a Host+Controller dual-chip standard architecture. To be specific, the Bluetooth Host is deployed on an application process chip, and the Bluetooth Controller is deployed on the Bluetooth chip. The Bluetooth architecture of the electronic device 100 may alternatively be another architecture.

For example, the Bluetooth architecture of the electronic device 100 may alternatively be a single-chip architecture. To be specific, the Bluetooth Host and the Bluetooth Controller are integrated into one chip. Communication between the Bluetooth Host and the Bluetooth Controller does not require the physical interface, namely, the HCI; instead, the Bluetooth Host and the Bluetooth Controller may directly interact through a logical interface (for example, an application programming interface). For another example, the Bluetooth architecture of the electronic device 100 may alternatively be a customized dual-chip architecture. The Bluetooth Host and the Bluetooth Controller communicate through the physical interface, namely, the HCI, but a used communication protocol is defined by a manufacturer.

It can be understood that a method provided in embodiments of this application is also applicable to another Bluetooth architecture (for example, the single-chip architecture or the customized dual-chip architecture) different from the Host+Controller dual-chip standard architecture. This is not limited in embodiments of this application.

Since a Bluetooth technology emerges, not only many data transmission problems are resolved, but also a door to a wireless life is opened. The Bluetooth technology is favored by various intelligent devices. However, this technology brings some security problems while bringing convenience to our lives. A most serious problem is that an address of a Bluetooth device is disclosed. A Bluetooth address in the Bluetooth device is unique. Once a Bluetooth address of a user is solved by a third-party user, the third-party user may obtain Bluetooth data of the user based on the Bluetooth address. In a process in which the user performs Bluetooth communication with another user, the third-party user may monitor or even tamper with content of both communication parties, and may further obtain the Bluetooth data of the user, thereby causing a problem that privacy of the user is disclosed.

Currently, in the field of Bluetooth technologies, a widely applied Bluetooth address is a resolvable private address (RPA), and the RPA is a private device address generated based on an identity resolving key (IRK). The RPA is periodically updated based on the identity resolving key. After the RPA is updated, the RPA existing before updating is disabled. The third-party user cannot determine the Bluetooth device based on the RPA existing before updating, to greatly improve security of the Bluetooth technology.

Before an Android R version, the Bluetooth Host updates the RPA based on the IRK every 15 minutes. Because the Bluetooth Host is deployed on an AP chip, when a Bluetooth function is enabled and the AP chip sleeps, the Bluetooth Host wakes up the AP chip every 15 minutes. After the AP chip wakes up, an application deployed on the AP chip is also woken up, thereby increasing power consumption of the AP chip.

After the R version, for security, the Bluetooth Host deployed on the AP chip updates the RPA within 7 minutes to 15 minutes (one path of random address needs to be used for a current BLE pairing connection, and two paths of random addresses need to be used for system application broadcasting). This means that timers of the three paths of random addresses may wake up the AP chip for three times to six times within 7 minutes to 15 minutes. In this case, a quantity of times that the AP chip is woken up increases, and a quantity of times that the application deployed on the AP chip is woken up also increases. Consequently, more power of the AP chip is consumed, and working performance of the AP chip is greatly affected.

To resolve a problem that when a Bluetooth function of an electronic device 100 is enabled, because a Bluetooth Host periodically updates an RPA, power of an AP chip is consumed, and working performance of the AP chip is affected, an embodiment of this application provides a Bluetooth random address generation method. The method includes: After generating an IRK, a Bluetooth Host may send the IRK to a sensor hub or a Bluetooth Controller. The sensor hub or the Bluetooth Controller periodically updates an RPA based on the IRK sent by the Bluetooth Host. When the Bluetooth Host needs to execute a Bluetooth service, the sensor hub or the Bluetooth Controller may send a latest updated RPA to the Bluetooth Host, so that the Bluetooth Host can execute the Bluetooth service. Because power consumed when the sensor hub/Bluetooth Controller updates the RPA is less than power consumed when the Bluetooth Host updates the RPA, the Bluetooth Host decentralizes an RPA updating function to the sensor hub/Bluetooth Controller, to reduce power consumption of an AP chip, and further improve working performance of the AP chip.

The following provides example descriptions of an application scenario of a Bluetooth random address generation method according to an embodiment of this application with reference to FIG. 3A-FIG. 3D. FIG. 3A-FIG. 3D are diagrams of a group of example user interfaces of an electronic device 100 according to an embodiment of this application. In FIG. 3A-FIG. 3D, the electronic device 100 and an electronic device 200 are included, and the electronic device 100 and the electronic device 200 may be connected through Bluetooth.

Figure 3A:
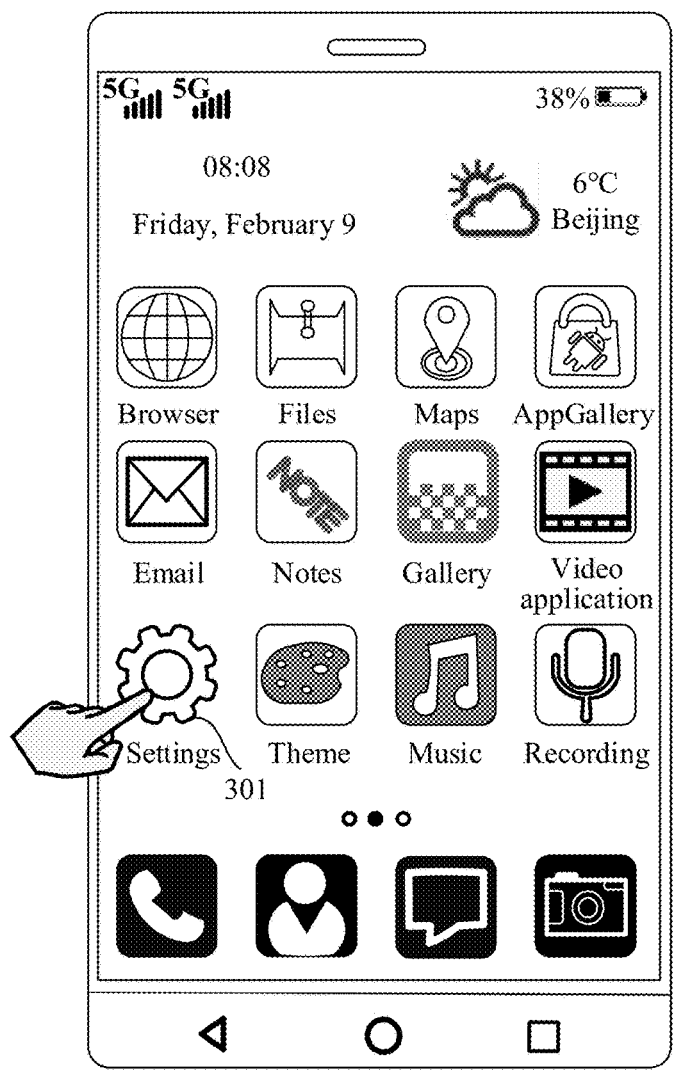
FIG. 3A-FIG. 3D are diagrams of a group of example user interfaces of an electronic device 100 according to an embodiment of this application.
Figure 3A:
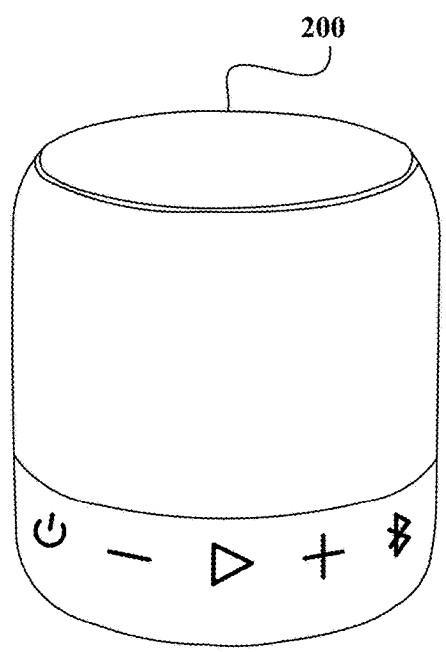

FIG. 3A shows a user interface 30. The user interface 30 is a home screen of the electronic device 100. The home screen includes a Settings icon 301 and another application icon. After the electronic device 100 detects an input operation (for example, a tap operation) for the Settings icon 301, the electronic device 100 displays, in response to the operation, a user interface 31 shown in FIG. 3B.

Figure 3B:
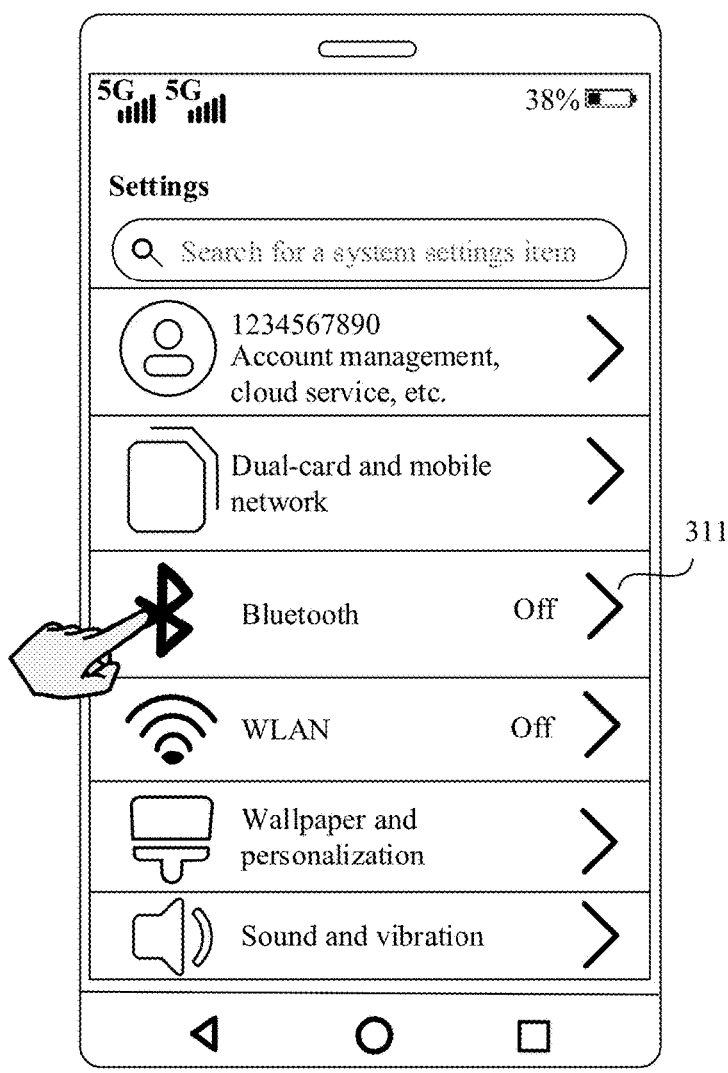
Figure 3B:
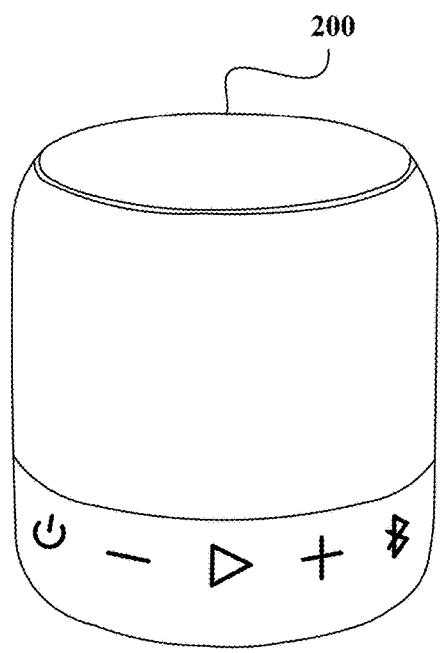

As shown in FIG. 3B, the user interface 31 includes a Bluetooth setting icon 311. After the electronic device 100 detects an input operation (for example, a tap operation) for the Bluetooth setting icon 311, the electronic device 100 displays, in response to the operation, a user interface 32 shown in FIG. 3C.

Figure 3C:
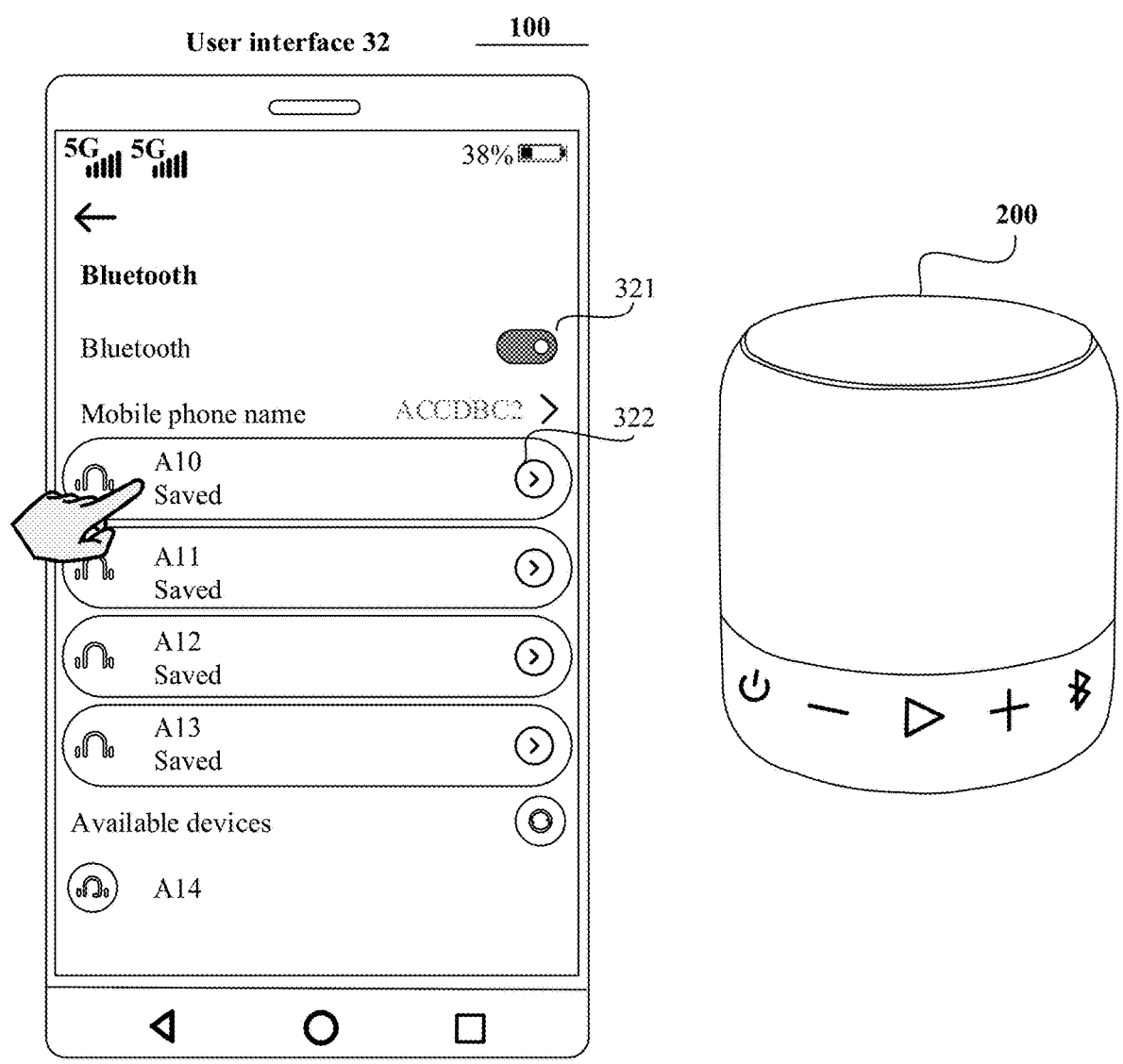

As shown in FIG. 3C, the user interface 32 includes a Bluetooth enabling control 321 and a Bluetooth device display area 322. After the electronic device 100 detects a tap operation on the Bluetooth enabling control 321, a Bluetooth function of the electronic device 100 is enabled in response to the operation. In this case, the electronic device 100 may perform Bluetooth pairing with and a Bluetooth connection to another Bluetooth device. The Bluetooth device display area 322 is configured to display a device name of a Bluetooth device once-connected to the electronic device 100. For example, in the Bluetooth device display area 322, a device name "A10" is a device name of the electronic device 200. After the electronic device 100 detects a tap operation on "A10", the electronic device 100 performs a Bluetooth connection to the electronic device 200 in response to the operation. After the connection succeeds, the electronic device 100 displays a user interface 33 shown in FIG. 3D.

Figure 3D:
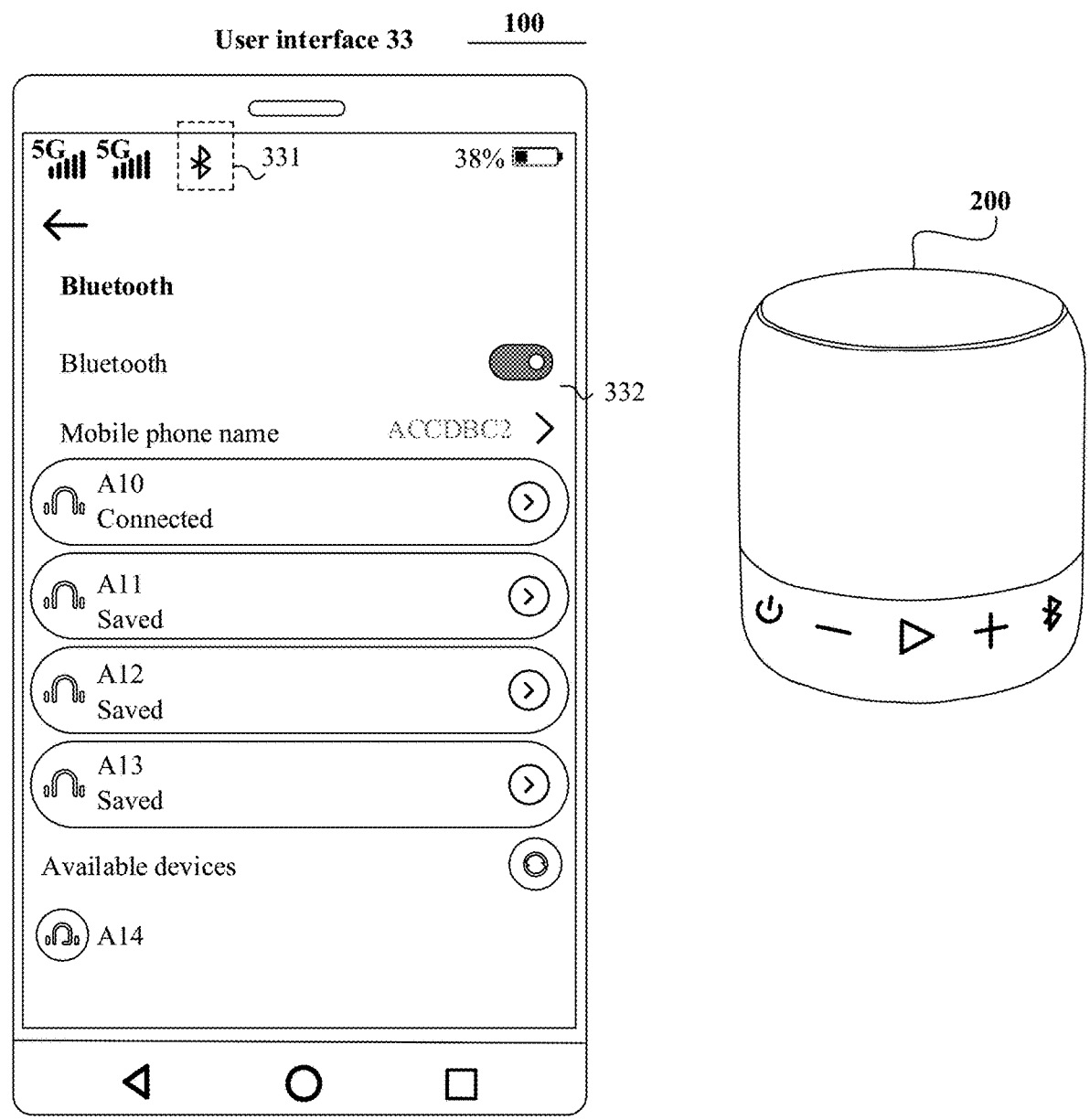

As shown in FIG. 3D, the user interface 33 is an interface displayed after the Bluetooth connection between the electronic device 100 and the electronic device 200 succeeds. It can be learned from the Bluetooth device display area 332 that a device display icon of "A10" displays a word "Connected", and the user interface 33 displays a Bluetooth icon 331.

Figure 4:
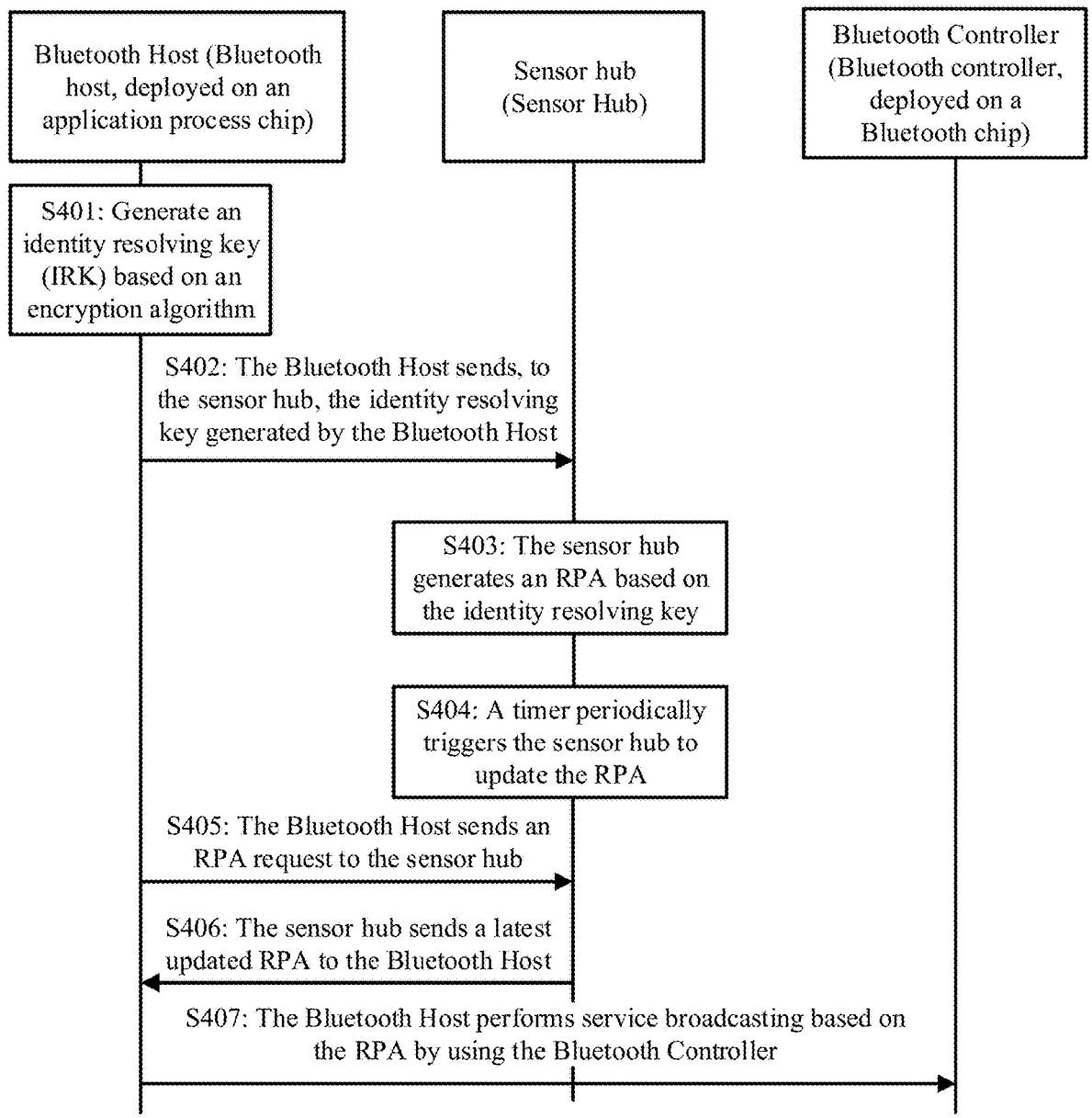
FIG. 4 is a flowchart of a Bluetooth random address generation method according to an embodiment of this application.

The following describes, with reference to FIG. 4, a specific procedure of a Bluetooth random address generation method provided in an embodiment of this application. FIG. 4 is a flowchart of a Bluetooth random address generation method according to an embodiment of this application. When a Bluetooth function of an electronic device is enabled, before an AP chip sleeps, a Bluetooth Host may send, to a sensor hub, an identity resolving key (IRK) generated by the Bluetooth Host. In a process in which the AP chip sleeps (that the AP chip sleeps means that an application in the AP chip is not in a running state), the sensor hub periodically updates an RPA based on the IRK sent by the Bluetooth Host. When the AP chip is woken up and the AP chip needs to execute a Bluetooth service based on the RPA, the sensor hub may send a latest updated RPA to the Bluetooth Host. A specific procedure is as follows:

Step S401: The Bluetooth Host generates the identity resolving key based on an encryption algorithm.

Specifically, after the Bluetooth function of the electronic device is enabled, the Bluetooth Host generates the IRK based on the encryption algorithm. The IRK is used to generate and periodically update the RPA.

For example, a user may tap a Bluetooth application icon in the electronic device, and the Bluetooth function of the electronic device is enabled in response to an operation of the user. It can be understood that the foregoing example merely illustrates a scenario of enabling the Bluetooth function through a tap, and does not constitute a limitation on this embodiment of this application. In some embodiments, a network application may alternatively be started by using another operation. FIG. 3B shows a user interface 31. As shown in FIG. 3B, the user may tap a Bluetooth enabling icon in the user interface 31, to obtain a Bluetooth connection icon shown in FIG. 3C. The Bluetooth display icon is used to indicate that the Bluetooth function of the electronic device is enabled currently.

For example, the Bluetooth Host may generate the IRK based on an Aes_128 function, that is, IRK=Aes_128(rand, a, b). Herein, rand is a random number generated by the Bluetooth Host based on a random number function, a is a first parameter required for generating the IRK by the Bluetooth Host, and b is a second parameter required for generating the IRK by the Bluetooth Host.

It should be understood that, the foregoing merely provides an example description of the encryption algorithm used by the Bluetooth Host to generate the IRK, and constitutes no limitation on the protection scope of this embodiment of this application. The Bluetooth Host may alternatively calculate the IRK based on another encryption algorithm. A type of the encryption algorithm used by the Bluetooth Host is not limited in this embodiment of this application.

Step S402: The Bluetooth Host sends, to the sensor hub, the identity resolving key generated by the Bluetooth Host.

Specifically, after generating the IRK, the Bluetooth Host may send, to the sensor hub, the IRK generated by the Bluetooth Host, so that the sensor hub may generate and periodically update the RPA based on the IRK generated by the Bluetooth Host. The Bluetooth Host may send the IRK to the sensor hub through an interface and a communication protocol that are independently defined by the Bluetooth Host and the sensor hub. For example, the Bluetooth Host may send the IRK to the sensor hub through an inter-integrated circuit (Inter-Integrated Circuit, I2C) interface and a related communication protocol, or may send the IRK to the sensor hub through another interface. A specific communication manner between the Bluetooth Host and the sensor hub is not limited in this embodiment of this application.

Step S403: The sensor hub generates the RPA based on the identity resolving key.

Specifically, the sensor hub generates the RPA after receiving the identity resolving key sent by the Bluetooth Host. For example, the sensor hub may update the RPA based on a function Generate_RPA (IRK, Random). Herein, Random is a random number generated by the sensor hub based on a random function.

After receiving the identity resolving key sent by the Bluetooth Host, the sensor hub may start a Timer, and the Timer may periodically trigger the sensor hub to update the RPA.

Step S404: The timer periodically triggers the sensor hub to update the RPA.

Specifically, after the sensor hub starts the Timer, the Timer periodically triggers the sensor hub to update the RPA based on the identity resolving key. For example, the Timer may send a triggering instruction to the sensor hub every 6 minutes. After receiving the triggering instruction, the sensor hub may update the RPA based on the function Generate_RPA (IRK, Random).

Step S405: The Bluetooth Host sends an RPA request to the sensor hub.

Specifically, when an application in the AP chip needs to execute a Bluetooth service based on the RPA, the Bluetooth Host may send an RPA request to the sensor hub. The RPA request is used to indicate the sensor hub to send the latest updated RPA of the sensor hub to the Bluetooth Host, so that the application deployed in the AP chip can execute the Bluetooth service based on the RPA. After receiving the RPA request command sent by the Bluetooth Host, the sensor hub sends the latest updated RPA to the Bluetooth Host, so that the application deployed in the AP chip can execute the corresponding Bluetooth service based on the RPA. The sensor hub may send the RPA to the Bluetooth Host through an interface and a communication protocol that are independently defined by the sensor hub and the Bluetooth Host. For example, the sensor hub may send the updated RPA to the sensor hub through an inter-integrated circuit (Inter-Integrated Circuit, I2C) interface and a related communication protocol, or may send the updated RPA to the Bluetooth Host through another interface. A specific communication manner between the sensor hub and the Bluetooth Host is not limited in this embodiment of this application. After the Bluetooth Host receives the RPA sent by the sensor hub, the application that needs to execute the Bluetooth service (for example, Bluetooth pairing) in the AP chip invokes the RPA, sends the RPA to a Bluetooth Controller, and performs service broadcasting based on the RPA address by using the Bluetooth Controller, so as to complete the related Bluetooth service of the application.

For example, the Bluetooth Host may invoke a host controller interface (Host Controller Interface, HCI) to send the RPA to the Bluetooth Controller, or may invoke another interface to send the RPA to the Controller for broadcasting. A type of an interface invoked by the Bluetooth Host to send the RPA to the Bluetooth Controller is not limited in this embodiment of this application.

Step S406: The sensor hub sends the latest updated RPA to the Bluetooth Host.

Step S407: The Bluetooth Host performs service broadcasting based on the RPA by using the Bluetooth Controller.

Specifically, after the Bluetooth Host receives the RPA sent by the sensor hub, an application that has a Bluetooth service requirement in the AP chip invokes the RPA, and then performs service broadcasting using the RPA by the Bluetooth Controller, to implement a Bluetooth service of the application.

In some embodiments, when the application in the AP chip needs to execute the Bluetooth service based on the RPA and the Bluetooth Host does not execute a task of periodically updating the RPA, the Bluetooth Host may directly send the RPA request to the sensor hub. The RPA request includes identification information of the application that needs to execute the Bluetooth service based on the RPA, and the RPA request is used to indicate the sensor hub to send the latest updated RPA of the sensor hub to the Bluetooth Controller, so that the application that needs to execute the Bluetooth service can perform service broadcasting based on the RPA by using the Bluetooth Controller, and execute the related Bluetooth service.

Optionally, when the AP chip is in a sleep state, in a process in which the sensor hub periodically updates the RPA based on the identity parsing key sent by the Bluetooth Host, the sensor hub may monitor a state of the AP chip. When the sensor hub detects that an application runs, the sensor hub may send first indication information to the Bluetooth Host. The first indication information is used to indicate the Bluetooth Host to periodically update the RPA based on the IRK, and the sensor hub no longer executes the task of periodically updating the RPA. In other words, the sensor hub returns RPA generation and updating functions to the Bluetooth Host. In this way, when an application needs to execute a Bluetooth service based on the RPA, the application may directly invoke the RPA from the AP chip.

Optionally, when no application runs in the AP chip, an electronic device may analyze an application usage preference of the user in a historical time period (for example, within three months) based on user data. Therefore, a specific application to be used by the user in a specific time period may be predicted, to predict a specific time period in which the AP chip may be in an active state. In the time period in which the AP chip may be in the active state, the sensor hub may re-decentralize, to Bluetooth Host, the task of periodically updating the RPA.

For example, the electronic device may learn, through analysis based on user data in last three months, that the user plays music in a time period 15:00~16:00 every day by using the electronic device. The electronic device may predict that a music application is in a running state in the time period 15:00~16:00 (the AP chip is not in a sleep state). Therefore, the sensor hub may re-decentralize, to the Bluetooth Host at a moment 15:00, the task of periodically updating the RPA. In this way, when an application needs to execute a Bluetooth service based on the RPA, the application may directly invoke the RPA from the AP chip.

In this embodiment of this application, when the Bluetooth function of the electronic device is enabled, before the AP chip sleeps, the Bluetooth Host may send, to the sensor hub, the IRK generated by the Bluetooth Host, so that the sensor hub can generate the RPA based on the IRK sent by the Bluetooth Host, and periodically update the RPA. Because power consumption required when the sensor hub updates the RPA is far less than power consumption required when the Bluetooth Host updates the RPA, the Bluetooth Host decentralizes an RPA updating function to the sensor hub, to effectively avoid a problem that power consumption of the AP chip is increased when the AP chip is in a sleep state and is woken up because the RPA needs to be periodically updated, to improve working performance of the AP chip.

Figure 5:
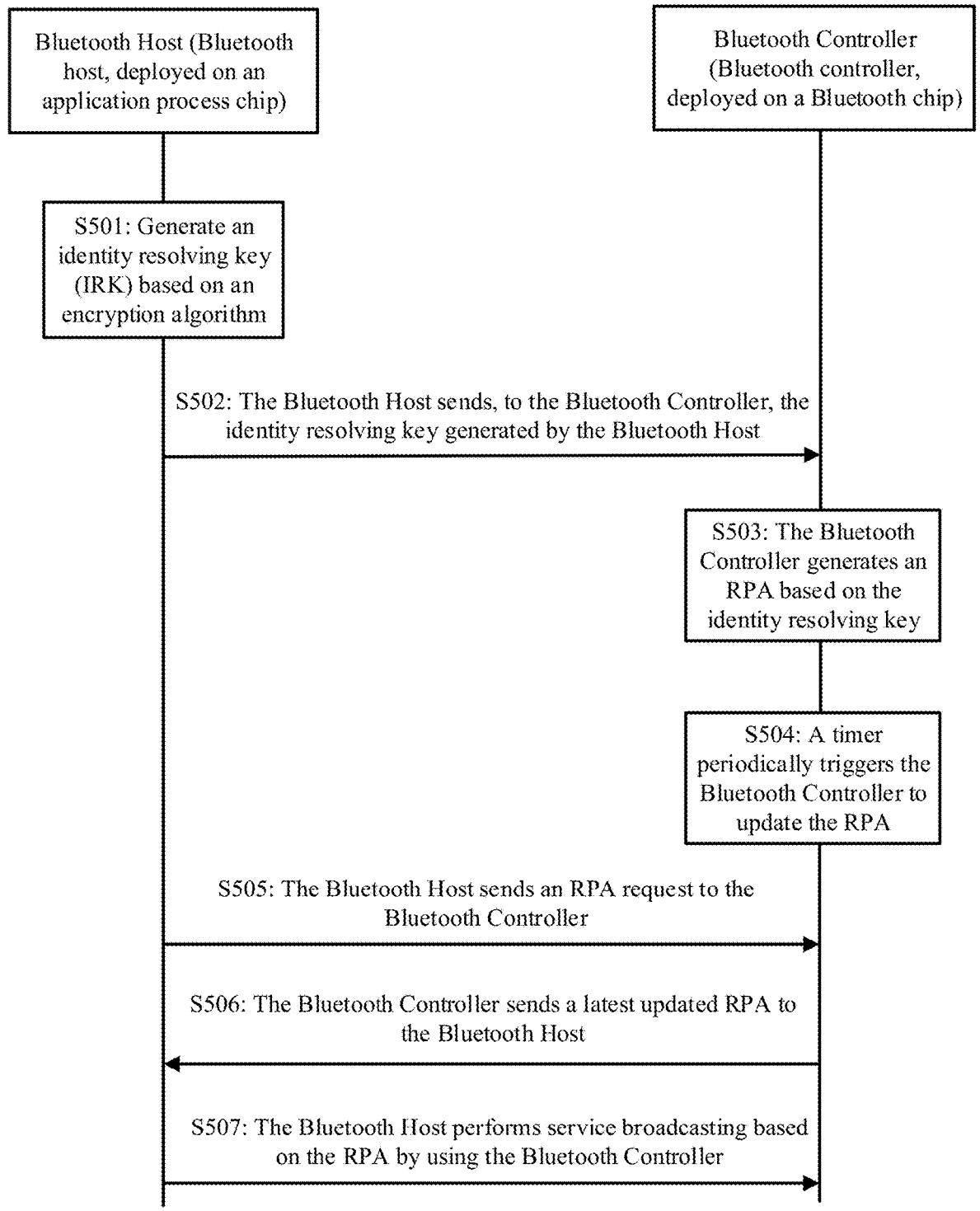
FIG. 5 is a flowchart of another Bluetooth random address generation method according to an embodiment of this application.

The foregoing embodiment in FIG. 4 describes a specific process in which when a Bluetooth function of an electronic device is enabled, a Bluetooth Host decentralizes, to a sensor hub, a function of periodically updating an RPA. In some embodiments, the Bluetooth Host decentralizes, to a Bluetooth Controller, the function of periodically updating the RPA. The following describes the process with reference to FIG. 5. FIG. 5 is a flowchart of another Bluetooth random address generation method according to an embodiment of this application. When the Bluetooth function of the electronic device is enabled, before an AP chip sleeps, the AP chip sends, to a Bluetooth Controller module, an identity resolving key (IRK) generated by the AP chip. In a process in which the AP chip sleeps, the Bluetooth Controller module periodically updates the RPA based on the IRK sent by the Bluetooth Host in the AP chip. When the AP chip is woken up and the AP chip needs to execute a Bluetooth service based on the RPA, the Bluetooth Controller module sends a latest updated RPA to the Bluetooth Host in the AP chip. A specific procedure is as follows:

Step S501: The Bluetooth Host generates the identity resolving key based on an encryption algorithm.

Step S502: The Bluetooth Host sends, to the Bluetooth Controller, the identity resolving key generated by the Bluetooth Host.

Step S503: The Bluetooth Controller module generates the RPA based on the identity resolving key.

Step S504: A timer periodically triggers the Bluetooth Controller to update the RPA.

For step S501~step S504, refer to step S401~step S404 in the foregoing embodiment in FIG. 4. Details are not described herein again in this embodiment of this application.

Step S505: The Bluetooth Host sends an RPA request to the Bluetooth Controller.

Specifically, when an application in the AP chip needs to execute a Bluetooth service based on the RPA, the Bluetooth Host may send the RPA request to the Bluetooth Controller. The RPA request is used to indicate the sensor hub to send the latest updated RPA of the sensor hub to the Bluetooth Host, so that the application deployed in the AP chip can execute the Bluetooth service based on the RPA. After receiving the RPA request command sent by the Bluetooth Host, the Bluetooth Controller sends the latest updated RPA to the Bluetooth Host, so that the application deployed in the AP chip can execute the corresponding Bluetooth service based on the RPA. The Bluetooth Controller may invoke a host controller interface (Host Controller Interface, HCI) to send the RPA to the Bluetooth Host, or may invoke another interface to send the RPA to the Bluetooth Host. A type of an interface invoked by the Bluetooth Controller to send the RPA to the Bluetooth Host is not limited in this embodiment of this application. After the Bluetooth Host receives the RPA sent by the Bluetooth Controller, an application that has a Bluetooth service requirement invokes the RPA, and then performs service broadcasting using the RPA by the Bluetooth Controller, to implement a Bluetooth service.

Step S506: The Bluetooth Controller sends the latest updated RPA to the Bluetooth Host.

Step S507: The Bluetooth Host performs service broadcasting based on the RPA by using the Bluetooth Controller.

Specifically, after the Bluetooth Host receives the RPA sent by the Bluetooth Controller, an application that has a Bluetooth service requirement in the AP chip invokes the RPA, and then performs service broadcasting using the RPA by the Bluetooth Controller, to implement a Bluetooth service of the application.

In some embodiments, when the application in the AP chip needs to execute the Bluetooth service based on the RPA and the Bluetooth Host does not execute a task of periodically updating the RPA, the Bluetooth Host may directly send a Bluetooth service request instruction to the Controller. The Bluetooth service request instruction includes identification information of the application that needs to execute the Bluetooth service based on the RPA, and the Bluetooth service request instruction is used to indicate the Bluetooth Controller to perform service broadcasting using the RPA, so that the application that needs to execute the Bluetooth service can perform service broadcasting based on the RPA by using the Bluetooth Controller, and execute the related Bluetooth service.

Optionally, in a process in which the Bluetooth Controller periodically updates the RPA based on the identity resolving key sent by the Bluetooth Host, the Bluetooth Controller may monitor a state of the AP chip. When the Bluetooth Controller detects that the AP chip is restored from a sleep state to a wakeup state, the Bluetooth Controller may send an RPA updating request to the Bluetooth Host. The updating request is used to indicate the Bluetooth Host to execute the task of periodically updating the RPA. The Bluetooth Controller no longer executes the task of periodically updating the RPA. In other words, the Bluetooth Controller returns RPA generation and updating functions to the Bluetooth Host. In this way, when an application needs to execute a Bluetooth service based on the RPA, the application may directly invoke the RPA from the AP chip.

Optionally, the electronic device may analyze an application usage preference of a user in a period of time (for example, three months) based on user data. Therefore, a specific application to be used by the user in a specific time period may be predicted, to predict a specific time period in which the AP chip may be in an active state. In the time period in which the AP chip may be in the active state, the Bluetooth Controller may re-decentralize, to Bluetooth Host, the task of periodically updating the RPA. For example, the electronic device may learn, through analysis based on user data in last three months, that the user plays music in a time period 15:00~16:00 every day by using the electronic device. The electronic device may predict that a music application is in a running state in the time period 15:00~16:00 (the AP chip is not in a sleep state). Therefore, the Bluetooth Controller may re-decentralize, to the Bluetooth Host at a moment 15:00, the task of periodically updating the RPA. In this way, when an application needs to execute a Bluetooth service based on the RPA, the application may directly invoke the RPA from the AP chip.

Figure 6:
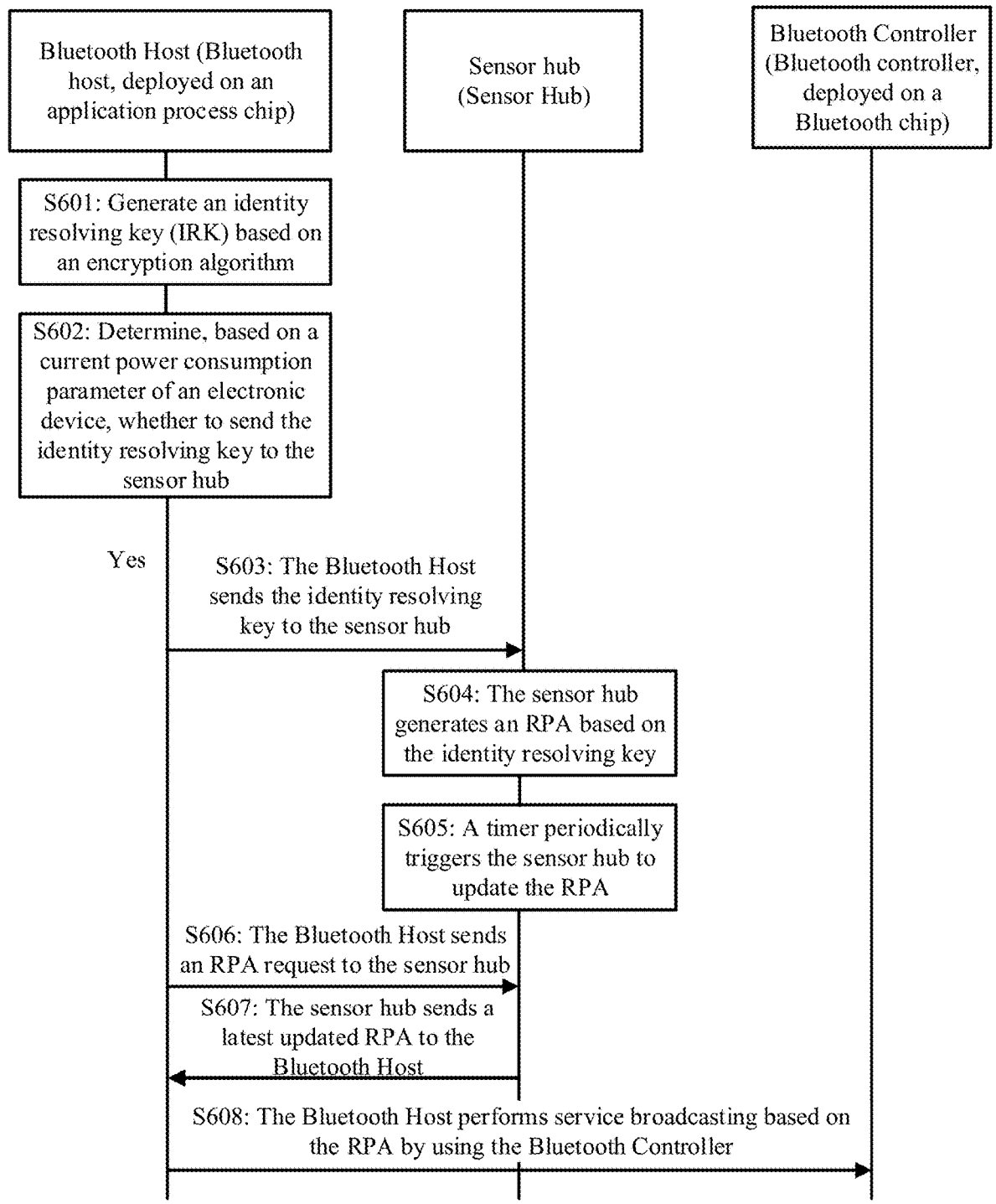
FIG. 6 is a flowchart of another Bluetooth random address generation method according to an embodiment of this application.

The embodiments shown in FIG. 4-FIG. 5 describe a case in which before an AP chip is in a sleep mode, a Bluetooth Host decentralizes, to a sensor hub or a Bluetooth Controller, a function of periodically updating an RPA, to avoid a case in which power consumption of the AP chip is greatly increased when the AP chip in a sleep state is repeatedly woken up because the Bluetooth chip periodically updates the RPA in a process in which the AP chip sleeps. When the Bluetooth function of the electronic device is enabled and the AP chip is in a working state, the AP chip may determine, based on current power consumption, whether the function of periodically updating the RPA by the Bluetooth Host needs to be decentralized to the sensor hub/Bluetooth Controller. The following provides, with reference to FIG. 6, descriptions by using an example in which the Bluetooth Host decentralizes, to the sensor hub, the function of periodically updating the RPA. FIG. 6 is a flowchart of another Bluetooth random address generation method according to an embodiment of this application. In a procedure in FIG. 6, an AP chip is in a working state. A specific procedure is as follows:

Step S601: The Bluetooth Host generates an identity resolving key based on an encryption algorithm.

Specifically, for a specific implementation process of step S601, refer to step S401. Details are not described herein again in this embodiment of this application.

Step S602: Determine, based on a current power consumption parameter of the electronic device, whether to send the identity resolving key to the sensor hub.

Specifically, the current power consumption parameter of the electronic device may be a current level of a battery of the electronic device. When the current battery level is less than a first threshold, the Bluetooth Host may decentralize, to the sensor hub, the function of periodically updating the RPA. In other words, the Bluetooth Host sends the IRK to the sensor hub. The first threshold may be obtained based on historical data, or based on an empirical value, or based on experimental data. This is not limited in this embodiment of this application.

For example, when a battery level of the electronic device is less than 10%, the Bluetooth Host may send, to the sensor hub, the IRK generated by the Bluetooth Host. The sensor hub updates the RPA based on the IRK every 7 minutes. When an application needs to execute a Bluetooth service based on the RPA, the sensor hub may send a latest updated RPA of the sensor hub to the Bluetooth Host, so that the application can execute the Bluetooth service based on the RPA.

Because power consumption required when the Bluetooth Host periodically updates the RPA is far greater than power consumption required when the sensor hub periodically updates the RPA, when the battery level of the electronic device is insufficient, the Bluetooth Host decentralizes an RPA updating function to the sensor hub, to reduce overall power consumption of the electronic device, thereby prolonging standby time of the electronic device.

In some embodiments, the power consumption parameter of the electronic device may be a quantity of high-power consumption applications in applications that currently run on the electronic device. The electronic device may analyze power consumption of an application in a period of time (for example, within last three months) based on user data/ system data, and classify applications into a high-power consumption application and a non-high-power consumption application based on power consumption of the applications. When the quantity of high-power consumption applications in the applications that currently run on the electronic device is greater than or equal to a second threshold, the Bluetooth Host may send the IRK to the sensor hub.

For example, a quantity N of standby times of the electronic device in a historical time period (for example, last three months) and a percentage of power consumption of an application in each standby process may be counted. If a percentage of power consumption of an application is greater than the third threshold (for example, 30%) during the standby processes for more than M times, the application is marked as a high-power consumption application; or if the percentage of the power consumption of the application is greater than a third threshold (for example, 30%) in less than M standby processes, the application is marked as a non-high-power consumption application. If a quantity of high-power consumption applications that currently runs on the AP chip is greater than or equal to the second threshold (for example, the second threshold is 3), the Bluetooth Host sends the IRK to the sensor hub, so that the sensor hub can generate the RPA based on the IRK, and periodically update the RPA.

Step S603: When determining that the Bluetooth Host needs to send the identity resolving key to the sensor hub, the Bluetooth Host sends the identity resolving key to the sensor hub.

Step S604: The sensor hub generates the RPA based on the identity resolving key.

Step S605: A timer periodically triggers the sensor hub to update the RPA.

Step S606: The Bluetooth Host sends an RPA request to the sensor hub.

Step S607: The sensor hub sends the latest updated RPA to the Bluetooth Host.

Step S608: The Bluetooth Host performs service broadcasting based on the RPA by using the Bluetooth Controller.

For a specific process of step S603-step S608, refer to step S402-step S407. Details are not described herein again in this embodiment of this application.

It should be understood that step S601 may be performed before step S602, or may be performed after step S602, provided that step S601 is performed before step S603. A sequence of performing step S601 and step S602 is not limited in this embodiment of this application.

In some embodiments, when the application in the AP chip needs to execute the Bluetooth service based on the RPA and the Bluetooth Host does not execute a task of periodically updating the RPA, the Bluetooth Host may directly send a Bluetooth service request instruction to the sensor hub. The Bluetooth service request instruction includes identification information of the application that needs to execute the Bluetooth service based on the RPA, and the Bluetooth service request instruction is used to indicate the sensor hub to send the latest updated RPA of the sensor hub to the Bluetooth Controller, so that the application that needs to execute the Bluetooth service can perform service broadcasting based on the RPA by using the Bluetooth Controller, and execute the related Bluetooth service.

Optionally, when the AP chip is in a sleep state, in a process in which the sensor hub periodically updates the RPA based on the identity parsing key sent by the Bluetooth Host, the sensor hub may monitor a state of the AP chip. When the sensor hub detects that the AP chip is restored from a sleep state to a wakeup state, the sensor hub may send second indication information to the Bluetooth Host. The second indication information is used to indicate the Bluetooth Host to execute a task of periodically updating the RPA, and the sensor hub no longer executes the task of periodically updating the RPA. In other words, the sensor hub returns RPA generation and updating functions to the Bluetooth Host. In this way, when an application needs to execute a Bluetooth service based on the RPA, the application may directly invoke the RPA from the AP chip.

Optionally, when the AP chip is in the sleep state, the electronic device may analyze an application usage preference of a user in a period of time (for example, three months) based on user data. Therefore, a specific application to be used by the user in a specific time period may be predicted, to predict a specific time period in which the AP chip may be in an active state. In the time period in which the AP chip may be in the active state, the sensor hub may re-decentralize, to Bluetooth Host, the task of periodically updating the RPA. For detailed descriptions, refer to content corresponding to the embodiment in FIG. 4. Details are not described herein again.

In this embodiment of this application, when the Bluetooth function is enabled and the AP chip is in the working state, the AP chip may determine, based on current power consumption, whether the function of periodically updating the RPA by the Bluetooth Host needs to be decentralized to the sensor hub/Bluetooth Controller. If current power consumption of the AP chip is high, the Bluetooth Host decentralizes, to the sensor hub, the function of periodically updating the RPA, to reduce power consumption of the AP chip, improve working efficiency of the AP chip, and prolong standby time of the electronic device.

All or some of the foregoing embodiments may be implemented by using software, hardware, firmware, or any combination thereof. When the software is used for implementation, some or all of the embodiments may be implemented in a form of a computer program product. The computer program product includes one or more computer instructions. When the computer program instructions are loaded and executed on a computer, the procedure or functions according to this application are all or partially generated. The computer may be a general-purpose computer, a special-purpose computer, a computer network, or another programmable apparatus. The computer instructions may be stored in a computer-readable storage medium or transmitted from one computer-readable storage medium to another computer-readable storage medium. For example, the computer instructions may be transmitted from one website, computer, server, or data center to another website, computer, server, or data center in a wired manner (for example, a coaxial cable, an optical fiber, or a digital subscriber line) or a wireless manner (for example, infrared, wireless, or microwave). The computer-readable storage medium may be any usable medium accessible by a computer, or a data storage device, for example, a server or a data center, integrating one or more available media. The usable medium may be a magnetic medium (for example, a floppy disk, a hard disk, or a magnetic tape), an optical medium (for example, a DVD), a semiconductor medium (for example, a solid state disk Solid State Disk), or the like.

A person of ordinary skill in the art may understand that all or some of the processes of the methods in the foregoing embodiments may be implemented by a computer program instructing related hardware. The program may be stored in a computer-readable storage medium. When the program is executed, the processes in the foregoing method embodiments may be included. The foregoing storage medium includes any medium that can store program code, for example, a ROM, a random storage memory RAM, a magnetic disk, or a compact disc.

In conclusion, the foregoing descriptions are only embodiments of the technical solutions of the present invention, and are not intended to limit the protection scope of the present invention. Any modifications, equivalent replacements, improvements, or the like made based on the disclosure of the present invention shall fall within the protection scope of the present invention.

What is claimed is:

1. A Bluetooth random address generation method, applied to an electronic device, wherein the electronic device comprises a Bluetooth Host and a Bluetooth module, and the method comprises:
    generating, by the Bluetooth Host, an identity resolving key (IRK);
    sending, by the Bluetooth Host, the IRK to the Bluetooth module when the electronic device meets a first condition, wherein the first condition is a condition for triggering the electronic device to reduce power consumption;
    generating, by the Bluetooth module, a resolvable private address (RPA) based on the IRK, and periodically updating the RPA based on the IRK;
    sending, by the Bluetooth Host, an RPA request to the Bluetooth module when the Bluetooth Host needs to execute a Bluetooth service;
    sending, by the Bluetooth module, a latest updated RPA to the Bluetooth Host; and
    executing, by the Bluetooth Host, the Bluetooth service based on the latest updated RPA.

2. The method according to claim 1, wherein the Bluetooth module is a Bluetooth Controller or a sensor hub.

3. The method according to claim 1, wherein the first condition is as follows:
    no application currently runs on the electronic device; or
    a current battery level of the electronic device is less than a first threshold; or
    a quantity of high-power consumption applications in applications that currently run on the electronic device is greater than or equal to a second threshold, wherein each of the high-power consumption applications is an application whose power consumption proportion exceeds a third threshold M or more times in N standby times in a historical time period.

4. The method according to claim 1, wherein after the generating, by the Bluetooth module, the RPA based on the IRK, and periodically updating the RPA based on the IRK, the method further comprises:
    when the first condition is that no application currently runs on the electronic device, periodically detecting whether an application is running on the electronic device; and
    sending, by the Bluetooth module, first indication information to the Bluetooth Host if it is detected that an application is running on the electronic device, wherein the first indication information is used to indicate the Bluetooth Host to generate an RPA based on the IRK, and periodically update the RPA based on the IRK.

5. The method according to claim 1, wherein after the generating, by the Bluetooth module, the RPA based on the IRK, and periodically updating the RPA based on the IRK, the method further comprises:
    periodically detecting a battery level of the electronic device when the first condition is that the current battery level of the electronic device is less than the first threshold; and
    sending, by the Bluetooth module, first indication information to the Bluetooth Host if it is detected that the battery level of the electronic device is greater than or equal to the first threshold, wherein the first indication information is used to indicate the Bluetooth Host to generate an RPA based on the IRK, and periodically update the RPA based on the IRK.

6. The method according to claim 1, wherein after the generating, by the Bluetooth module, the RPA based on the IRK, and periodically updating the RPA based on the IRK, the method further comprises:
    when the first condition is that the quantity of high-power consumption applications in the applications that currently run on the electronic device is greater than or equal to the second threshold, periodically detecting a quantity of high-power consumption applications that run on the electronic device; and
    sending, by the Bluetooth module, second indication information to the Bluetooth Host if it is detected that the quantity is less than the second threshold, wherein the second indication information is used to indicate the Bluetooth Host to generate an RPA based on the IRK, and periodically update the RPA based on the IRK.

7. An electronic device, comprising a memory, a first processor, a Bluetooth module, and a touchscreen, wherein
    the touchscreen is configured to display content;
    the memory is configured to store a computer program, wherein the computer program comprises program instructions;
    the first processor is configured to: invoke the program instructions, to generate an identity resolving key (IRK); and
    send the IRK to the Bluetooth module when the electronic device meets a first condition;
    the Bluetooth module is configured to: generate a resolvable private address (RPA) based on the IRK, and periodically update the RPA based on the IRK;
    the Bluetooth Host sends an RPA request to the Bluetooth module when the Bluetooth Host needs to execute a Bluetooth service;
    the Bluetooth module sends a latest updated RPA to the Bluetooth Host; and
    the Bluetooth Host executes the Bluetooth service based on the latest updated RPA.

8. The electronic device according to claim 7, wherein the Bluetooth module is a Bluetooth Controller or a sensor hub.

9. The electronic device according to claim 7, wherein the first condition is as follows:
    no application currently runs on the electronic device; or
    a current battery level of the electronic device is less than a first threshold; or
    a quantity of high-power consumption applications in applications that currently run on the electronic device is greater than or equal to a second threshold, wherein each of the high-power consumption applications is an application whose power consumption proportion exceeds a third threshold M or more times in N standby times in a historical time period.

10. The electronic device according to claim 7, wherein after the Bluetooth module generates the RPA based on the IRK, and periodically updates the RPA based on the IRK,
    whether an application is running on the electronic device is periodically detected when the first condition is that no application currently runs on the electronic device; and
    the Bluetooth module sends first indication information to the Bluetooth Host if it is detected that an application is running on the electronic device, wherein the first indication information is used to indicate the Bluetooth Host to generate an RPA based on the IRK, and periodically update the RPA based on the IRK.

11. The electronic device according to claim 7, wherein after the Bluetooth module generates the RPA based on the IRK, and periodically updates the RPA based on the IRK,
   a battery level of the electronic device is periodically detected when the first condition is that a current battery level of the electronic device is less than a first threshold; and
   the Bluetooth module sends first indication information to the Bluetooth Host if it is detected that the battery level of the electronic device is greater than or equal to the first threshold, wherein the first indication information is used to indicate the Bluetooth Host to generate an RPA based on the IRK, and periodically update the RPA based on the IRK.

12. The electronic device according to claim 7, wherein after the Bluetooth module generates the RPA based on the IRK, and periodically updates the RPA based on the IRK,
   a quantity of high-power consumption applications that run on the electronic device is periodically detected when the first condition is that a quantity of high-power consumption applications in applications that currently run on the electronic device is greater than or equal to a second threshold; and
   the Bluetooth module sends second indication information to the Bluetooth Host if it is detected that the quantity is less than the second threshold, wherein the second indication information is used to indicate the Bluetooth Host to generate an RPA based on the IRK, and periodically update the RPA based on the IRK.

13. A non-transitory computer-readable storage medium, wherein the computer-readable storage medium stores a computer program, and when the computer program is executed by a processor, the method according to claim 1 is implemented.

* * * * *